March 2, 1937.    L. LEROY    2,072,404
MERCURY VAPOR RECTIFIER
Filed May 11, 1933    3 Sheets-Sheet 1

Inventor:-
Louis Leroy,
By- Smith, Michael & Gardiner,
Attorneys

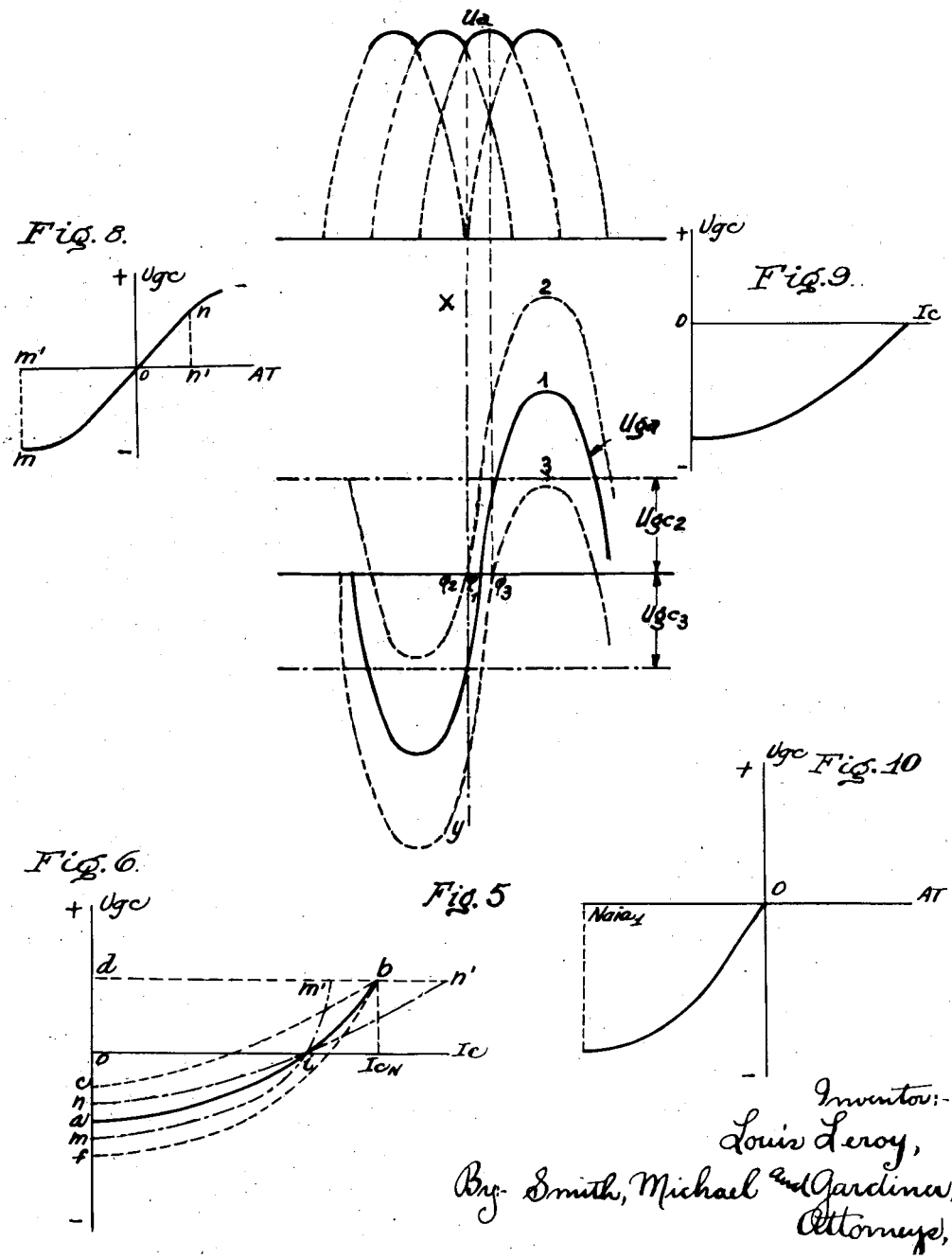

March 2, 1937.  L. LEROY  2,072,404
MERCURY VAPOR RECTIFIER
Filed May 11, 1933  3 Sheets-Sheet 3

Inventor
Louis Leroy,
By:- Smith, Michael & Gardiner,
Attorneys.

Patented Mar. 2, 1937

2,072,404

UNITED STATES PATENT OFFICE 2,072,404

MERCURY VAPOR RECTIFIER

Louis Leroy, Paris, France, assignor to Forges & Ateliers de Constructions Electriques de Jeumont, Societe Anonyme, Paris, France, a French joint-stock company Application May 11, 1933, Serial No. 670,586
In France May 27, 1932

2 Claims. (Cl. 175—363)

This invention relates to rectifiers of the mercury vapor discharge or arc type, and has for its object to provide means for regulating the direct current voltage furnished by the rectifier as a function of the output or rectified current, by means of anode grids excited by a suitable voltage in such a way that the current regulation is effected in a continuous and progressive manner. Various systems have already been proposed for regulating the direct current voltage furnished by a rectifier, utilizing anode grids of controlled potential. They have all this in common that the grid voltage, whether it be of sinusoidal or rectangular wave-form, must be dephased more or less in relation to the anode voltage in order to produce the desired regulation. When it is proposed to realize an automatic and continuous regulation of the rectifier voltage as a function of the rectified current supplied, according to a law differing from the natural characteristic of the rectifier, it is difficult to obtain a regulation of the angle of phase displacement between the grid voltage and the anode voltage as a function of the current.

The present invention provides means for attaining this result in the following manner:—

(1) The grid voltage employed is composed of an alternating voltage (for example of sinusoidal wave-form and of the same frequency as that of the anode voltage) upon which is superposed a variable direct current voltage, in such a way that the dephasing of the grid voltage relative to the anode is reduced to a variation in value of the direct current voltage. In other words, there is substituted for a variable dephasing of the alternating voltage, a variation of a direct voltage.

(2) The direct voltage component of the grid voltage is progressively varied as a function of the current output in order to obtain such a characteristic as is desired for the direct voltage furnished by the rectifier.

The invention is hereafter more fully described with reference to the accompanying drawings, in which:—

Figure 5 is a diagram representing a sinusoidal voltage having superposed thereon a direct voltage to provide a varying grid voltage, the anode voltage being shown in the upper part of the diagram.

Figure 6 represents various relations between the direct current component of the grid voltage and the output current of the rectifier.

Figures 8 to 11 are other diagrams hereinafter explained.

Figure 1:
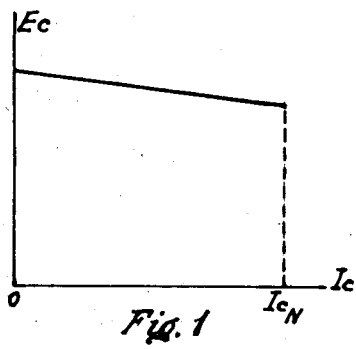
Figure 1 represents the natural characteristic of a mercury vapor rectifier.
Figure 2:
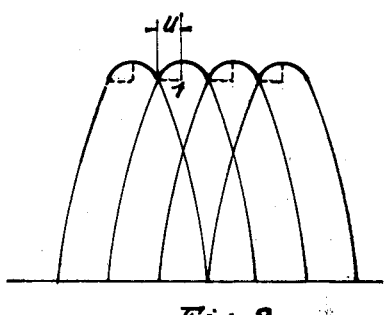
Figure 2 represents the continuous voltage wave-form of a six-phase rectifier, the full line being the form at no load and the dotted line showing the form under load.

The natural characteristic (voltage as a function of the output current) of a rectifying apparatus of the mercury vapor type has a downward slope, due to the increase of the angle of overlap when the direct current increases. Figure 1 represents the natural characteristic of such a rectifier, and Figure 2 the form of the direct voltage of a six-phase rectifier at no-load (full line) and under load (dotted line).

Figure 3:
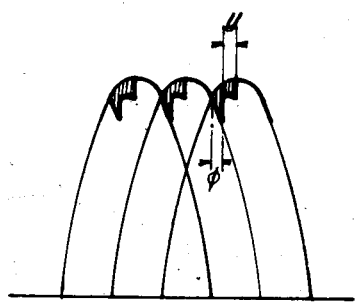
Figure 3 represents the corresponding current.

If the angle of delay in the ignition of an anode be represented by $\phi$, the aspect of the curve under load will be that represented in Figure 3. If there be adopted for the angle $\phi$ a value $\phi_0$ for no load, when the output current $Ic=0$, and if the value of the angle $\phi$ be thereafter caused to decrease from $\phi_0$, when the current $Ic$ increases and the angle $u$ therefore likewise increases, it is clear that the mean value of the direct voltage $Ec$ can be maintained constant or may increase when $Ic$ increases. The following three cases are obtained:

(1) Assume that for $Ic=0$, the angle $\phi$ has a given value $\phi_0$ and let $\phi$ be caused to decrease from $\phi_0$ for an increasing value of $Ic$. There can then be obtained between no load operation and normal load $Ic_N$ a voltage characteristic of the hypercompound type, which only begins to fall after the normal load (curve 1 in Figure 4).

(2) Assume that for $Ic=0$, the angle $\phi$ has a given value $\phi_0$, and let $\phi$ be caused to decrease from $\phi_0$ for an increasing value of $Ic$. There can then be obtained between no-load operation and normal load $Ic_N$ a compound characteristic, which begins to fall after the normal load (curve 2 in Figure 4).

(3) Assume that for $Ic=0$, the angle $\phi=0$ and let $\phi$ be caused to increase at the same time as $Ic$. The direct voltage obtained (curve 4 in Figure 4) decreases more rapidly than the natural characteristic (represented by the curve 3 in Figure 4) up to the normal load $Ic_N$ and from that point it decreases along the natural slope.

Figure 4:
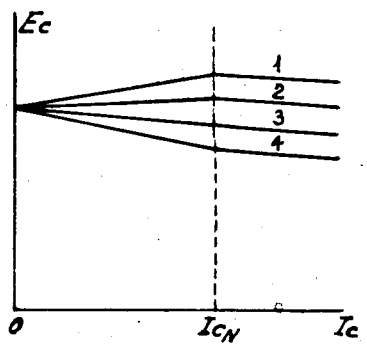
Figure 4 shows the natural characteristic and a group of voltage curves differing therefrom, obtained by the present invention.

It is therefore possible to obtain for the rectifying apparatus, by suitably selecting the relation between the angle $\phi$ and the output current $Ic$ and therefore the angle $u$, varying characteristics of the voltage under load, of which the slope may vary between the limits indicated by the curves 1 and 4 in Figure 4.

The voltage applied to the grids is represented in Figure 5 as a sinusoidal voltage component $Uga$, of the same frequency as the anode voltage, upon which there is superposed a variable direct voltage component $Ugc$. It will be assumed that the moment of ignition of the arc at an anode occurs when the grid voltage takes on the same potential as that of the cathode; this is not quite correct but the approximation is sufficient.

The upper part of Figure 5 represents the direct voltage with the anode voltage $Ua$. The direct component $Ugc$ of the grid voltage is first given the value $Ugc_2$, and the resulting grid voltage is as shown by the dotted curve 2; there is obtained an angle $\phi$ of value $\phi_2$ which in the particular case considered (axis $xy$) is equal to 0. If then there is given to the direct component the value $Ugc_3$ of opposite polarity, the resulting grid voltage will be as shown by the curve 3, to which there corresponds an angle $\phi$ of value $\phi_3$. It will be noted that the phase relation of the sinusoidal component of the grid voltage is maintained constant, but that the sign of the direct component has been changed. It is thus possible to regulate the moment of ignition of the arc by merely regulating the value (in magnitude or in sign) of the direct component of the grid voltage. The combination shown in Figure 5 is not limitative for it is possible to adopt any desired value for the dephasing angle $\phi$ of the alternating voltage applied to the grid.

The invention has particular relation to the realization of any law $Ugc=f(Ic)$, whereby a given characteristic of voltage under load can be obtained, the method adopted for causing the direct grid voltage component to vary as a function of the output current being immaterial. In a more general manner, it comprises likewise any system for regulating by means of excited grids the direct voltage furnished by a rectifier under load as a function of the direct current supplied.

By way of example, there will be considered the case of a compound voltage characteristic (see curve 2 in Figure 4). The value of the dephasing angle $\phi_0$ corresponding to no-load operation ($Ic=0$) is fully determined by fixing the fall of the normal direct voltage between no-load operation and the normal load ($Ic_N$). On the other hand, at the normal load ($Ic_N$) the value of the dephasing angle $\phi$ is nil. It will further be assumed that the constant dephasing of the sinusoidal grid voltage component shall be equal to $\phi_0/2$. In Figure 6, the full-line curve ($aib$) represents the rate of increase of the direct grid voltage component $Ugc$ as a function of the output current $Ic$ which it is necessary to secure in order that the direct voltage $Ec$ shall be maintained constant.

Figure 7:
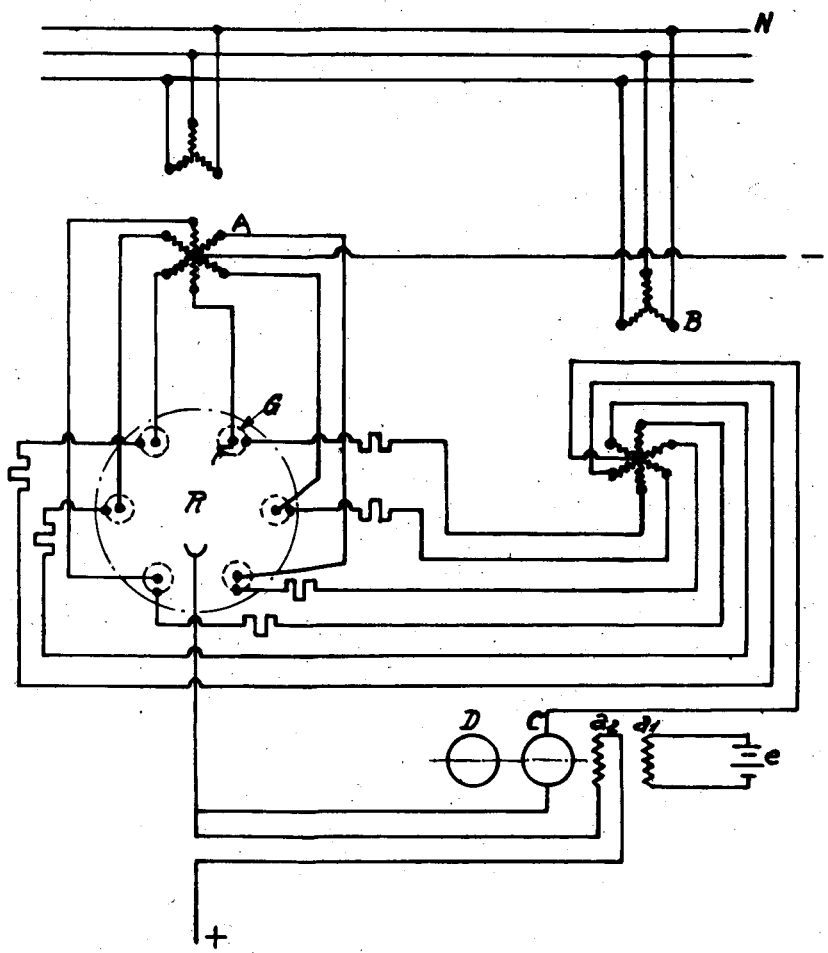
Figure 7 is a diagram of an arrangement for carrying out the invention.

Figure 7 shows an installation diagram allowing of obtaining this regulation. The parts represented in this diagram are as follows:—

A: transformer with six-phase secondary.
B: induction regulator with six-phase secondary.
R: rectifier with six anodes.
F: rectifier anodes.
G: rectifier grids.
N: three-phase supply system.
C: direct current generator for grid excitation.
T: motor driving generator C.
$a_1$: independent field winding of generator C.
$a_2$: field winding of generator C in series with the rectifier and traversed by the output or rectified current.
$e$: source of supply for field winding $a_1$.

The two field windings $a_1 a_2$ of the generator C are arranged to act in opposition. Seeing that the current furnished to the grids G is very small, the direct grid voltage component $Ugc$ can be considered as the no-load voltage of the generator. Figure 8 represents the voltage ($Ugc$) furnished by the generator as a function of the resultant ampere turns. At the point $m$, only the independent field winding $a_1$ is traversed by current furnished by the source $e$, so that the ampere turns $om^1 = N_{a1} \cdot i_{a1}$, where $N_{a1}$ is the number of turns of the field winding $a_1$ and $i_{a1}$ is the current in that winding. As the rectified or output current $Ic$ increases, the resultant ampere turns become $N_{a1} \cdot i_{a1} - N_{a2} Ic$, where $N_{a2}$ is the number of turns in the series field winding $a_2$.

The voltage curve shown in Figure 4 will have a shape which is approximately that of the curve ($aib$) in Figure 6 which is to be obtained. In order to obtain more perfect regulation of the output voltage, it will be possible to modify the dephasing of the sinusoidal voltage or to regulate the speed of rotation of the generator C; the saturation of the field magnets of the generator C might also be varied for the same purpose.

The generator C will, with advantage, be provided with laminated pole pieces in order to diminish the distortion of the voltage curve ($Ugc$) by hysteresis according as the output current $Ic$ is increasing or decreasing.

The reversal of polarity of the generator C, as in the preceding example, can be obviated in the following manner; it suffices to regulate the angle of phase displacement of the sinusoidal voltage component so that its value shall be 0, by adopting always for the origin of the abscissae the axis $xy$ of Figure 5. In these conditions, the direct grid voltage, component $Ugc$ as a function of the output current $Ic$ must have the shape presented in Figure 9.

The generator C remains provided with the two field windings $a_1 a_2$ acting in opposition, as in Figure 7, but the exciting current $i_{a1}$ for the independent field winding $a_1$ is regulated in a different way, so that the characteristic (voltage $Ugc$ as a function of the field ampere turns AT) shall be that of Figure 10.

The arrangements which have been described above may be applied to the case of obtaining characteristic curves of a different shape. Without entering into more detail, it may be pointed out that shunt voltage characteristics are given by the dotted curves in Figure 6 representing $Ugc=f(Ic)$ and lying between the horizontal line ($db$) and the full-line curve ($aib$) corresponding to compound operation. The characteristics are more steeply inclined as the curves ($nin'$, $cb$) approach the line ($db$) to which the natural characteristic of the rectifier corresponds.

The curves situated below the compound operation curve ($ab$), for example that marked $fb$, will produce operation with a hyper-compound characteristic.

Figure 11:
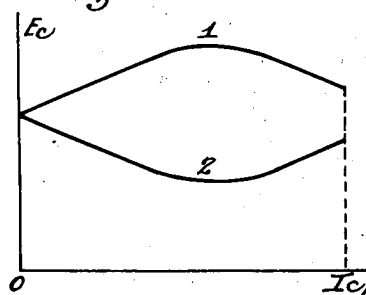

The families of curves which can be contemplated may all pass through the point $b$, which means that for all the corresponding voltage-characteristics the voltage under normal load ($Ic=Ic_N$) will be the same. It is possible to imagine other groups or families of curves, for example all passing through the point $i$ (such as the curves $mim'$ in Figure 6); these curves are easy to obtain with the same generator, it being only necessary to vary either its speed or its saturation. The aspect of the direct voltage characteristics of the rectifier is of course modified by substituting one of these curves for another; the direct grid voltage component curve *mtm'* in Figure 6 corresponds to the direct output voltage characteristic *l* in Figure 11, and the direct component curve *nin'* in Figure 6 would correspond to the output characteristic represented by the curve *2* in Figure 11.

In a similar way, groups or families of curves can be drawn to correspond to a direct grid voltage component of the form shown in Figure 9.

The regulation of the direct voltage of a rectifier as a function of its load, according to the present invention, amounts then to the provision of an alternating grid voltage combined with a direct electromotive force of which the value varies according to a suitable law or curve as a function of the direct current supplied by the rectifier, and in this way a well-defined direct voltage characteristic can be obtained for the rectifier.

This voltage regulation is effected in a progressive manner and without lag; only the time-constant of the field magnets of the direct generator feeding the grid limits this lag or inertia, and it can be made very low. This advantage is very valuable and it gives the proposed system great flexibility as compared with systems of voltage regulation by changing the taps upon the supply transformers by means of automatic relays.

It will be understood that the invention is not limited to the particular arrangements of apparatus described by way of example; moreover, the alternating component of the voltage applied to the grids need not necessarily be of sinusoidal shape nor of the same frequency as the frequency of the anode voltage.

What I claim is:—

1. In combination with a mercury vapor rectifier having an anode and control electrode, means for applying to said control electrode an alternating voltage having superposed thereon a variable direct voltage, and a generator for supplying said variable direct voltage, said generator having two opposing field windings, one of said field windings being separately excited and the other of said field windings being fed by the current supplied by the rectifier.

2. In combination with a mercury vapor rectifier having a plurality of anodes and control electrodes, means for feeding polyphase current to said anodes, a polyphase transformer feeding said control electrodes, and a direct current generator connected between the cathode of said rectifier and the neutral point of said polyphase transformer, said generator having two field windings acting in opposition, one of said field windings being separately excited and the other of said field windings being fed by the current supplied from the cathode of said rectifier.

LOUIS LEROY.